United States Patent Office 3,038,012
Patented June 5, 1962

---

3,038,012
PREPARATION OF MONOALKYLATED PENTABORANE
Elmar R. Altwicker, Dayton, and Alfred B. Garrett, Columbus, Ohio, Earl A. Weilmuenster, Kenmore, N.Y., and Samuel W. Harris, Oxford, Ohio, assignors, by mesne assignments, to Olin Mathieson Chemical Corporation, a corporation of Virginia
No Drawing. Filed Mar. 28, 1955, Ser. No. 497,408
9 Claims. (Cl. 260—606.5)

Our invention relates to new chemical compositions which are alkylated pentaboranes and to a method for their production. The compositions of our invention can be used as fuels.

It is known in the art to prepare pentaborane-9, which is a relatively stable, colorless liquid melting at −46.8° C. Pentaborane-9 is a boron hydride or borane, and the art is aware that the burning of a borane with oxygen liberates considerably more energy than the oxidation of a corresponding amount of hydrocarbon, producing very high flame temperatures. This suggests the use of pentaborane-9 as a fuel of very high energy content. Pentaborane-9 suffers from the disadvantage, among other things, however, that it has a relatively high vapor pressure, its vapor pressure being 66 mm. of mercury at 0° C. and its boiling point at atmospheric pressure being 58° C.

In accordance with our present invention, we have discovered that pentaborane-9 and lower alkyl halides can be reacted in admixture with an alkylation catalyst to form monoalkylated pentaboranes. The alkyl halides used can contain from 1 to 5 carbon atoms. The new products produced in accordance with the method of our invention are borohydrocarbons of relatively high boron content and at the same time they are liquids having a somewhat lower vapor pressure than pentaborane-9 itself, so that they constitute a conveniently handled fuel of considerably greater energy content than the simple hydrocarbon fuels.

The following examples illustrate in detail the preparation of various compositions falling within the scope of our invention and are to be considered not limitative thereof.

Example I

To produce monomethylpentaborane-9 of the formula $B_5H_8CH_3$, 34.0 millimoles of pentaborane-9 and 72.8 millimoles of methyl iodide were reacted at 100° C. for twenty-four hours in admixture with 1.87 millimoles of aluminum chloride. The reaction was performed by introducing the pentaborane-9 and the methyl iodide into a reaction flask by means of vacuum transfer. After the reactants and aluminum chloride catalyst had been introduced, the flask was sealed off under vacuum and was placed in an oven set at the desired temperature. Upon the completion of the reaction, the reaction mixture was worked up in a standard vacuum line and fractionation train to yield 5.4 millimoles of hydrogen iodide, 30.3 millimoles of hydrogen and 27.6 millimoles of monomethylpentaborane-9 (81 percent yield). In addition, 0.881 grams of a product having a vapor pressure of 2.5 mm. of mercury at 27° C. and 0.015 grams of a product having a vapor pressure of 15 mm. of mercury at 0° C. were obtained. Further, a very small amount of methane was produced. There was also some non-volatile residue remaining in the reaction flask. This residue was dissolved in benzene and the solution thus produced released a gas when added to water.

The $B_5H_8CH_3$ produced was analyzed by oxidation, the analysis showing that it contained 15.8 percent carbon (15.57 percent calculated) and 69.4 percent boron (70.07 percent calculated). $B_5H_8CH_3$ is a colorless liquid with a vapor pressure of 34 mm. of mercury at 0° C. and crystallizes in plates at low temperatures.

Example II

To prepare monoethylpentaborane-9, 7.5 millimoles of aluminum chloride and 66 millimoles of ethyl bromide were placed in a 100 ml. flask sealed to a cold finger condenser (−80° C.). The reactor was attached to a high vacuum system through a ground glass joint. The contents of the flask were cooled to −195° C. and the system was evacuated. Pentaborane-9 (46 millimoles) was transferred into the reaction flask and the reactants were warmed to room temperature. The flask was heated periodically with a heat gun (maximum temperature 150° C.). The reactants changed to an orange-red color and a gas was evolved slowly. The reaction mixture was allowed to stand at room temperature for two days and the reaction products were separated by fractional condensation. About 37 millimoles of a liquid having a vapor pressure of 13 mm. of mercury at 0° C. was isolated. This product which mass spectrographic analysis showed was mainly monoethylpentaborane-9

$(B_5H_8CH_2CH_3)$ had a vapor pressure of 13 mm. of mercury at 0° C. and 48 mm. of mercury at 28° C. The material did not freeze at minus 78° C.

Example III 7.5 millimoles of aluminum chloride was placed in a 100 ml. flask sealed to a cold finger condenser (0° C.) and the reaction flask was attached to a high vacuum system. The reaction flask was immersed in liquid nitrogen (−196° C.) and the system was evacuated. 105 millimoles of normal propyl chloride and 105 millimoles of pentaborane-9 were transferred into the reactor. The reactants were allowed to warm to room temperature and refluxed while the cold finger was maintained at 0° C. A large amount of gas which did not condense at −78° C. was evolved. This gas was found to be propane, hydrogen chloride and a trace amount of diborane. A sample of the liquid which remained in the reactor was analyzed by mass spectrometry and the analysis showed that principally mono-n-propylpentaborane-9

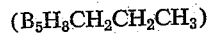
$(B_5H_8CH_2CH_2CH_3)$ had been formed. About 84 millimoles of a liquid having a vapor pressure of 4 mm. of mercury at 0° was isolated by means of fractional condensation in a standard vacuum line and fractionation train. This material did not freeze at −78° C.

Example IV

The synthesis of methylpentaborane-9 was carried out in an Autoclave Engineer's 250 ml. Magne Dash autoclave. One gram (8 millimoles) of $AlCl_3$ catalyst, 38.5 grams (763 millimoles) of methyl chloride and 31.5 grams (500 millimoles) of pentaborane-9 were charged to the autoclave and the autoclave was heated slowly to about 60° C. The maximum pressure of 750 p.s.i.g. was reached at 64° C. Total heating time, starting from room temperature, was 5 hours. Of 71 grams of materials charged, 45.5 grams were recovered as product. A 7.3 gram aliquot portion of this product was vacuum fractionated through a trap cooled with Dry Ice (−78° C.) followed by a trap cooled by liquid nitrogen (−196° C.). About 4.9 grams of material was collected in the traps. The fraction remaining (about 2.4 grams) was shown to be principally monomethylpentaborane-9 by infrared and mass spectrometer analysis. After the condensable volatile matrials were removed a residue, principally solids, of about 2 grams remained. The other condensable volatile materials consisted of various amounts of diborate, chlorodiboranes and boron trichloride as shown by infrared analysis.

Various modifications can be made in the procedures of the specific examples to provide other compositions which fall within the scope of our invention. Thus, in place of the methyl iodide, ethyl bromide and normal propyl chloride employed as reactants, there can be substituted equivalent amounts of other alkyl monohalides having from 1 to 5 carbon atoms, such as methyl chloride, methyl bromide, ethyl chloride, ethyl iodide, n-propyl bromide, i-propyl iodide, normal butyl chloride, isobutyl bromide, secondary butyl chloride, tertiary butyl iodide, normal amyl chloride, normal amyl bromide and the like. Likewise, in place of the aluminum chloride employed as a catalyst, there can be substituted other alkylation catalysts, such as other aluminum halides, for instance, aluminum bromide, or trihalides, particularly chlorides, of group IIIb elements (gallium, indium and thallium), for instance gallium trichloride.

As the specific examples illustrate, the relative proportions of pentaborane-9 and alkyl monohalide present in the reaction mixture can be varied considerably, without departing from the invention. In general, however, the molar ratio of alkyl monohalide to pentaborane-9 employed in carrying out the reaction will be within the range from 1 to 6. To limit polyalkylation it may be advantageous in the commercial production of alkylated pentaboranes to carry out the reaction in the presence of large excesses of pentaborane-9. The specific examples also show that the reaction temperature employed can be varied considerably, generally being within the range from about $-65$ to about $150°$ C.

The compositions of our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the monoethylpentaborane, for example, this local fuel to air ratio by weight is approximately 0.074. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combusion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products of our invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the products of our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products of our invention are such that good combustion performance can be attained even at the marginal operating conditions encountered at high altitudes, insuring efficient and stable combustion and improvement in the zone of operation before lean and rich extinction of the combustion porcess is encountered. Significant improvements in the non-afterburning performance of a gas turbine-afterburner combination is also possible because the high chemical reactivity of the products of our invention eliminates the need of flame holding devices within the combustion zone of the afterburner. When employed in an afterburner, the fuels of our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products of our invention will improve the combustion process of the ramjet in much the same manner as that described for the afterburner because of their improved chemical reactivity over that of simple hydrocarbon fuels. When employed in a ramjet the fuels of our invention will be simply substituted for hydrocarbon fuels and used in the established manner.

We claim:

1. A method for the preparation of a monoalkylated pentaborane-9 which comprises reacting pentaborane-9 and an alkyl monohalide selected from the group consisting of monochlorides, monobromides and monoiodides having from 1 to 5 carbon atoms while the reactants are in admixture with an alkylation catalyst selected from the tribromide, gallium trichloride, indium trichloride and thallium trichloride.

2. A method according to claim 1 in which the alkyl monohalide is methyl iodide.

3. A method according to claim 1 in which the alkyl monohalide is ethyl bromide.

4. A method according to claim 1 in which the alkyl monohalide is normal propyl chloride.

5. A method according to claim 1 in which the alkylation catalyst is aluminum chloride.

6. A method according to claim 1 in which the alkyl monohalide is an alkyl monochloride and in which the alkylation catalyst is aluminum chloride.

7. A method according to claim 1 in which the alkyl monohalide is methyl iodide and in which the alkylation catalyst is aluminum chloride.

8. A method according to claim 1 in which the alkyl monohalide is ethyl bromide and in which the alkylation catalyst is aluminum chloride.

9. A method according to claim 1 in which the alkyl monohalide is normal propyl chloride and in which the alkylation catalyst is aluminum chloride.

References Cited in the file of this patent

Hurd: J. Am. Chem. Soc. 70, 2053–5 (1948).

UNITED STATES PATENT OFFICE
CERTIFICATE OF CORRECTION

Patent No. 3,038,012                     June 5, 1962

Elmer R. Altwicker et al.

It is hereby certified that error appears in the above numbered patent requiring correction and that the said Letters Patent should read as corrected below.

Column 3, line 1, for "borate" read -- borane --; column 6, line 1, after "from the" insert -- group consisting of aluminum trichloride, aluminum --; column 6, line 4, for "methad" read -- method --.

Signed and sealed this 6th day of November 1962.

(SEAL)
Attest:

ERNEST W. SWIDER
Attesting Officer

DAVID L. LADD
Commissioner of Patents